United States Patent Office 2,918,345
Patented Dec. 22, 1959

2,918,345

PROCESS FOR PRINTING TEXTILE MATERIALS AND DYESTUFF PREPARATIONS THEREFOR

Armin Caliezi, Basel, Switzerland, assignor to Ciba Limited, Basel, Switzerland, a Swiss firm No Drawing. Application September 30, 1957
Serial No. 686,836

Claims priority, application Switzerland October 4, 1956

6 Claims. (Cl. 8—70)

This invention is based on the observation that valuable brown prints on textile materials of cellulose can be produced by using as dyestuff acedianthrone or an acedianthrone substituted by a nitrogen-free substituent containing at most 12 atoms.

It is known that only very weak dyeings are produced by using acedianthrone for dyeing by a method usual for dyeing with vat dyestuffs, so that it could not have been expected that very strong prints would be obtained by applying that compound by the usual printing methods.

As examples of substituted acedianthrones for use in the process of this invention, there may be mentioned, dichloro-, dibromo-, 2:2'-dimethyl-, mono- or di-bromo-2:2'-dimethyl-, 2:2'-dimethoxy- and 2:2'-diphenyl-acedianthrone.

The dyestuffs used in the process of this invention are in part known. They can be made by the usual methods, for example, by condensing the appropriate anthrone with glyoxal, or a compound yielding glyoxal under the conditions of reaction, to form the dianthronylideneethane, and subjecting the latter to ring closure by treatment with an acid condensing agent, such as sulfuric acid or aluminum chloride, in the presence of an oxidizing agent to form the acedianthrone.

In order to prepare dyestuff preparations suitable for use in printing, the dyestuffs are advantageously brought into a fine state of subdivision, for example, by grinding or preferably by reprecipitation from a suitable solvent, such as concentrated sulfuric acid. A dyestuff powder or paste so obtained may then be mixed with one or more printing assistants, and, if desired, dried, or used directly in the moist state for printing. As printing assistants there may be mentioned polyhydric alcohols, such as glycerine or glycol, urea, substituted ureas, sulfite cellulose waste liquor, condensation products of formaldehyde with naphthalene sulfonic acid, etc.

A dyestuff preparation so obtained, which is suitable for printing and may be dry or advantageously in a moist form, is used in the process of this invention by a method known for printing with vat dyestuffs. The dyestuff preparations can be used to produce good prints with special advantage by the customary potash printing process with the use of a formaldehyde sulfoxylate on a wide variety of materials, especially cellulose fibers, such as cotton, linen or artificial silk or staple fibers of regenerated cellulose. When desired, full deep tints can be produced in this manner.

The following examples illustrate the invention, the parts and percentages being by weight:

*Example 1*

200 parts of finely subdivided acedianthrone are made into a paste with 100 parts of water, 600 parts of a potash thickening (prepared from 90 parts of wheat starch, 330 parts of water, 100 parts of glycerine, 140 parts of British gum, 170 pars of tragacanth mucilage and 170 parts of potassium carbonate) and 100 parts of hydrosulfite. A cotton cloth is printed with the resulting paste.

The printed material is then dried at a moderate temperature, steamed for 5–10 minutes in air free "wet" steam at 101–103° C., rinsed in running water until the dyestuff is completely reoxidized, and soaped at the boil. A strong fast red-brown print is obtained.

*Example 2*

The procedure is the same as described in Example 1, except that instead of acedianthrone, there is used 2:2'-dimethyl-acedianthrone, monobromo- or dibromo-2:2'-dimethyl-acedianthrone, 2:2'-dichloracedianthrone or 2:2'-diphenyl-acedianthrone. Strong red-brown prints having excellent properties of fastness are likewise obtained.

The 2:2'-dimethyl-acedianthrone used in this example can be obtained as follows:

4 parts of bis-(2'-methyl-9'-anthronylidene)-ethane (obtained by condensing 1 mol of glyoxal sulfate with 2 mols of 2-methyl-anthrone-(9)) are added at 10° C. to a mixture of 20 parts of tetrachlorethane, 11.1 parts of acetic anhydride and 2.2 parts of concentrated sulfuric acid. The mixture is heated to 80° C. in the course of one hour. The whole is then stirred for 3 hours at 80° C., cooled to 20° C., and the precipitated dyestuff is filtered off. It is washed with tetrachlorethane, alcohol and water.

The bis-(2'-methyl-9'-anthronylidene)-ethane used as starting material can also be obtained by condensing 2-(4'-methyl)-benzyl-benzoic acid with glyoxal sulfate in glacial acetic acid.

The monobromo-dimethyl-acedianthrone used in this example can be prepared as follows:

1 part of bromine is run at 5–10° C. into a mixture of 30 parts of chlorosulfonic acid, 4.3 parts of 2:2'-dimethyl-acedianthrone and 0.2 part of iodine. The whole is then stirred for 20 hours at 20° C., and the solution is poured on to ice and water. There are obtained 4.8 parts of monobromo-dimethyl-acedianthrone.

The dibromo-dimethyl-acedianthrone used in this example may be prepared as follows:

1 part of bromine is run at 5–10° C. into a mixture of 30 parts of chlorosulfonic acid, 4.3 parts of 2:2'-dimethyl-acedianthrone and 0.2 part of iodine. The whole is then stirred for 20 hours at 20° C., the temperature is raised to 50° C. in the course of 7 hours, and the whole is stirred for 2 hours at 50° C. The mixture is worked up to yield 5.6 parts of dibromo-dimethylacedianthrone.

The diphenyl-acedianthrone used in this example may be prepared as follows:

25 parts of 4-phenyl-2'-carboxydiphenyl-methane (obtained by reducing 4'-phenyl-benzoyl-benzoic acid with zinc dust and caustic soda solution) are heated with 20 parts of glyoxal sulfate in 200 parts of acetic acid for 1½ hours at 100° C. The whole is then cooled to room temperature and the precipitated condensation product is filtered off.

The condensation product is heated with 140 parts of nitrobenzene, 35 parts of acetic anhydride and 7 parts of sulfuric acid of 96% strength to a temperature of 120° C. in the course of 2 hours. After cooling the mixture the precipitated 2:2'-diphenylacedianthrone is filtered off.

What is claimed is:

1. A process for printing cellulosic textile material which consists essentially in printing onto the said material a printing composition containing acedianthrone as essential color-imparting substance.

2. A process for printing cellulosic textile material which consists essentially in printing onto the said material by the potash printing method a printing composition containing acedianthrone as essential color-imparting substance.

3. A process for printing cellulosic textile material, which comprises applying to said material a printing paste containing acedianthrone, a potash thickening and hydrosulfite, drying the printed material, and steaming the latter.

4. Cellulosic textile material printed with acedianthrone.

5. Cellulose textile material which has been printed with acedianthrone by the potash printing method.

6. A printing preparation containing acedianthrone as essential color-imparting substance, said preparation also containing printing assistants.

References Cited in the file of this patent

UNITED STATES PATENTS

| | | |
|---|---|---|
| 2,318,439 | Waldron | May 4, 1943 |
| 2,447,993 | Vieira | Aug. 24, 1948 |
| 2,559,596 | Coffey | July 10, 1951 |
| 2,587,905 | Saville | Mar. 4, 1952 |

FOREIGN PATENTS

| | | |
|---|---|---|
| 779,542 | Great Britain | July 24, 1953 |